(12) United States Patent
Lederer et al.

(10) Patent No.: US 7,738,516 B2
(45) Date of Patent: Jun. 15, 2010

(54) METHOD AND APPARATUS FOR DETECTING AND AVOIDING MULTIPLE-PULSE STATES IN ULTRA-SHORT-PULSE LASER

(75) Inventors: Maximilian J. Lederer, Alberschwende (AT); Anne-Laure Calendron, Hohenems (AT)

(73) Assignee: High Q Laser Production GmbH, Hohenems (AT)

( * ) Notice: Subject to any disclaimer, the term of this patent is extended or adjusted under 35 U.S.C. 154(b) by 183 days.

(21) Appl. No.: 12/219,127

(22) Filed: Jul. 16, 2008

(65) Prior Publication Data

US 2009/0034564 A1 Feb. 5, 2009

(30) Foreign Application Priority Data

Jul. 24, 2007 (EP) .................................. 07112992

(51) Int. Cl.
*H01S 3/10* (2006.01)
*H01S 3/13* (2006.01)
*H01S 3/00* (2006.01)

(52) U.S. Cl. .......................... 372/30; 372/25; 372/38.08
(58) Field of Classification Search .................. 372/25, 372/29.02, 30, 38.08
See application file for complete search history.

(56) References Cited

U.S. PATENT DOCUMENTS 5,007,717 A 4/1991 Cutolo et al.
6,693,927 B1 2/2004 Horvath et al.
2003/0138006 A1 7/2003 Holsinger

OTHER PUBLICATIONS

Bruzzese et al., "Experimental investigation of macropulse fluctuations in a picosecond neouymium-doped yttrium aluminum garnet laser,"Journal of Physics D. Applied Physics. vol. 21, No. 12. Dec. 14. 1988. pp. 1710-1712.*
Lai et al; "Multiple pulse operation of a femtosecond Ti:sapphire laser"; Optics Communications, vol. 142, No. 1-3, pp. 45-49; North-Holland Publishing Co. Amsterdam, NL, Oct. 1, 1997.
Buijserd et al; "CPM laser with electronic feedback"; Measurement Science and Technology, vol. 1, No. 8, pp. 751-753; Institute of Physics Publishing, Bristol, GB, Aug. 1, 1990.
Reid et al; "Light-emitting diodes as measurement devices for femtosecond laser pulses"; Optics Letters, vol. 22, No. 4, pp. 233-235; Optical Society of America, Washington DC, US, Feb. 15, 1997.

(Continued)

*Primary Examiner*—Armando Rodriguez
(74) *Attorney, Agent, or Firm*—Oliff & Berridge, PLC (57) ABSTRACT

In a detection method for undesired double- or multiple-pulse states in an ultra-short-pulse laser system operated in the soliton regime and intended for generating femtosecond or picosecond pulses, comprising an amplifying laser medium for producing a laser emission, a laser resonator having at least one resonator mirror and a pump source, a first signal $\mu$ proportional to the pulse power P(t) or pulse energy averaged over the resonator cycle is measured for the laser emission. A second signal $\nu$ proportional to the square of the pulse power P(t), averaged over the resonator cycle, is measured for the laser emission, and the occurrence of a double- or multiple-pulse state is detected on the basis of a comparison of the measured signals $\mu$ and $\nu$.

15 Claims, 4 Drawing Sheets

OTHER PUBLICATIONS

Kikuchi; "Highly sensitive interferometric autocorrelator using SI avalanche photodiode as two-photon absorber"; Electronics Letters, vol. 34, No. 1, pp. 123-125.

Lederer et al; "Multipulse operation of a Ti:sapphire laser mode locked by an ion-implanted semiconductor saturable-absorber mirror"; Optical Society of America, vol. 16, No. 6, pp. 895-904; Jun. 1999.

Agrawal; "Nonlinear fiber optics"; Academic Press 1989, p. 114.

Sutherland; "Handbook of nonlinear optics"; Marcel Dekker, 1996, pp. 498-509.

Bruzzese et al., "Experimental investigation of macropulse fluctuations in a picosecond neodymium-doped yttrium aluminum garnet laser," *Journal of Physics D. Applied Physics*, vol. 21, No. 12, Dec. 14, 1988, pp. 1710-1712.

\* cited by examiner

METHOD AND APPARATUS FOR DETECTING AND AVOIDING MULTIPLE-PULSE STATES IN ULTRA-SHORT-PULSE LASER

The invention relates to a detection method for double- and multiple-pulse states in an ultra-short-pulse laser system according to the precharacterizing clause of Claim 1, a method for avoiding multiple-pulse states and optimising the laser operating point in such an ultra-short-pulse laser system, a measuring apparatus for detecting double- or multiple-pulse states according to the precharacterizing clause of Claim 9 and an ultra-short-pulse laser system.

Ultra-short-pulse laser systems, i.e. laser systems for generating laser pulses having pulse durations in the femtosecond or picosecond range have long been known in the prior art. An approach for producing corresponding pulse characteristics is mode-locked operation in the soliton regime, it being possible to produce single or multiple pulses per resonator cycle. These operating states depend both on the dispersion and self-phase modulation—and hence on the instantaneous pulse intensity—in the resonator and on the depth of modulation of the mode locking mechanism, the available gain bandwidth and other filter effects. The combination of said effects in a theoretical model makes it possible to determine beforehand the transitions between the operating states, at least assuming adiabatic pulse evolution as a "master equation approach". A description and modelling of the conditions appear, for example, in J. Opt. Soc. Am. 16 (1999), pages 895-904. However, the abovementioned approach provides a poor description in particular of lasers having long resonators. The discrete nature of the action of the abovementioned effects on the pulse shaping is more strongly evident here, which in turn affects the achievable pulse parameters, such as energy and pulse width, and the transitions between different operating states, i.e. the single- or multiple-pulse state.

Typical behaviour of a soliton laser which goes from single-pulse to double-pulse operation consists, for example, in the energy being approximately halved and the pulse width being approximately doubled in the case of the individual pulses within the resonator cycle. The transitions between the pulse states also typically show the hysteresis behaviour illustrated in FIGS. 2 and 3.

However, most applications of ultra-short-pulse lasers require single-pulse operation since pulse and energy and pulse duration are optimal here. In contrast to typical non-soliton lasers, these lasers therefore have an ideal operating point, at best a relatively narrow operating range, which is dictated not only by aspects relating to gain dynamics (quality-switched mode locking, etc). Since the greatest possible energy and shortest possible energy pulse width are typically also required in the application, the operating point of the laser must inevitably be located very close to the single-double pulse state hysteresis. Consequently, the operating point of the laser can be shifted into the range of the single-double pulse hysteresis even by slight changes in laser parameters, which may occur after run times of more than 1,000 h which are customary in industry. This in turn results in a finite probability that the laser will emit double pulses after switching on.

For the industrial suitability of ultra-short-pulse lasers, it is therefore very important to have a reliable, compact indicator of little complexity for the pulse state in order, if necessary, to initiate appropriate measures for avoiding or eliminating the double- or multiple-pulse state.

The prior art discloses two relatively complicated approaches for detecting double pulses in a laser. Firstly, pulses with a separation of up to 100 ps are detected by means of autocorrelation. Autocorrelation with the lags required for this purpose are commercially available, but the autocorrelation method is complicated and demanding in terms of apparatus. The other approach is based on the fact that pulses having a larger separation are detected by means of very fast photodiodes and oscilloscopes. Here too, the complexity and the requirements with regard to apparatus are high.

Autocorrelation and photodiode measurements for the detection of double pulses are described, for example, in Lai M. et al., "Multiple pulse operation of a femtosecond Ti:sapphire laser", Optics Communications, Vol. 142, No. 1-3, 1 Oct. 1997, pages 45 to 49. In the experiment, double-pulse states were produced by changing the operating point (increasing the pumping current and reducing the degree of coupling out), it having been observed that the autocorrelation width and spectral width had not particularly changed thereby. The experiments are instructive in showing that the chosen methods of measurement are very complicated (time-resolved autocorrelation and pulse variation by means of fast photodiode and oscilloscope). Furthermore, it is clear that they do not permit an unambiguous statement about the pulse state since there are pulse separations which are not unambiguously resolved either by the autocorrelator or by the photodiode. Only the choice of a photodiode with picosecond resolution and an autocorrelator with a long delay cable could provide a remedy here. Both are too expensive for industrial use and are sensitive to adjustment, bulky and unreliable, since visual assessment of the signals would be necessary.

Similar detection methods are disclosed, for example, in Buijserd A. N. et al., "CPM laser with electronic feedback", Measurement Science and Technology, Vol. 1, No. 8, 1 Aug. 1990, pages 751 to 753, and U.S. Pat. No. 6,693,927 B1 and US 2003/0138006 A1, although with different aims in each case.

The first-mentioned document describes the stabilisation of a colliding pulse mode-locked (CPM) laser by means of a control loop with photodiode. There, the full width at half maximum of the autocorrelation function of the pulses is observed and is used together with the output power for assessing the quality of the stabilisation. However, the arrangement shown is by no means suitable for detecting double- or multiple-pulse states in a soliton mode-locked laser and initiating suitable countermeasures for these undesired states.

U.S. Pat. No. 6,693,927 B1 discloses a method for the controlled starting of the mode-locking operation of a soliton oscillator. This takes place by means of a photodiode which detects the mode-locking status of the oscillator and, if this is not mode-locked, puts it into the pulse mode via a so-called "overdrive circuit" pumping current. The effects such as Q-switched mode-locking and double pulses which are sufficiently well known in the prior art are also mentioned and it is pointed out that other detectors (pectrometers, autocorrelators, frequency doublers, etc.) can also be used for the detection of mode-locking.

In contrast, US 2003/0138006 A1 describes laser stabilisation which permits precise adjustment and regulation of the laser output parameters, especially the power, by means of additional analogue access to a laser system otherwise adjustable with quantized steps.

It is the object of the present invention to provide a simplified and/or improved method which ensures reliable identification and a corresponding apparatus for detecting and distinguishing single- and double- or multiple-pulse states in an ultra-short-pulse laser in the soliton mode, increased robustness and a design optimized with regard to compactness and number of components also being desired.

A further object is the provision of a method for avoiding multiple-pulse states and for optimizing the laser operating point.

A further object is the provision of an ultra-short-pulse laser system optimized with regard to the operating point.

These objects are achieved, according to the invention, by embodiments having the features of Claims 1, 9 or 15 or the features of dependent claims, or these solutions are further developed.

The invention is based on a use of signals of two detectors, from which the operating state of the laser is concluded. Use is made here of the circumstance that both the curve of the instantaneous pulse power P(t) and the peak value thereof differ for the single- and multiple-pulse state, the maximum power $\hat{P}$ for the soliton resulting from averaged power $\langle P \rangle$ or energy $$E = \int_{-\infty}^{\infty} P(t)dt,$$

repeat frequency $f_{rep}$ and pulse duration $\tau_{FWHM}$ according to $$\hat{P} = \frac{\langle P \rangle \cdot 0.89}{\tau_{FWHM} f_{rep}} = \frac{E \cdot 0.89}{\tau_{FWHM}}.$$

Thus, an average value corresponding to the total energy in the resonator is now recorded by one detector, i.e. an integral over the pulse curve, whereas the signal of the other detector reacts to the peak intensity or peak power (maximum value). It should be noted that both signals are averaged and represent the variation over many resonator cycles, i.e. in contrast to measurements with fast photodiodes and autocorrelation, are free of time dependencies in the range of the resonator cycle time or less. The signal ratio provides information about the operating state or the occurrence of the double or multiple state.

In the soliton laser, the relationship between the parameters energy E, dispersion $\beta_2$, self-phase modulation parameter $\kappa$ and pulse width $\tau_{FWHM}$ of a $1^{st}$ order soliton, resulting from the solution of the nonlinear Schrödinger equation:

$$\tau_{FWHM} = \frac{3.526 \cdot |\beta_2|}{\kappa \cdot E} \quad (1)$$

is true over a wide operating range, which is described, for example, in G. P. Agrawal, "Nonlinear Fiber Optics", Academic Press, 1989, page 114.

There is therefore an indirect proportionality between pulse width and pulse energy. It should be noted that the relationship is true both for single pulses and for multiple pulses. With constant gain saturation, and hence constant total energy per cycle, a transition from the single-pulse regime to the double-pulse regime would therefore lead to the individual components of the double-pulse state each having half the energy and twice the pulse width of the single-pulse state. However, it should be noted that the gain saturation in the case of transitions changes easily owing to a shift in the dynamic losses in the resonator, as described in J. Opt. Soc. Am. 16 (1999), pages 895-904, which leads to a hysteresis, the extraction being more efficient in the double-pulse state.

The detection method according to the invention for double- or multiple-pulse states in an ultra-short-pulse laser system in the soliton regime and the associated detection arrangement are described below in more detail purely by way of example with reference to working examples shown schematically in the drawing. Specifically.

Figure 1:
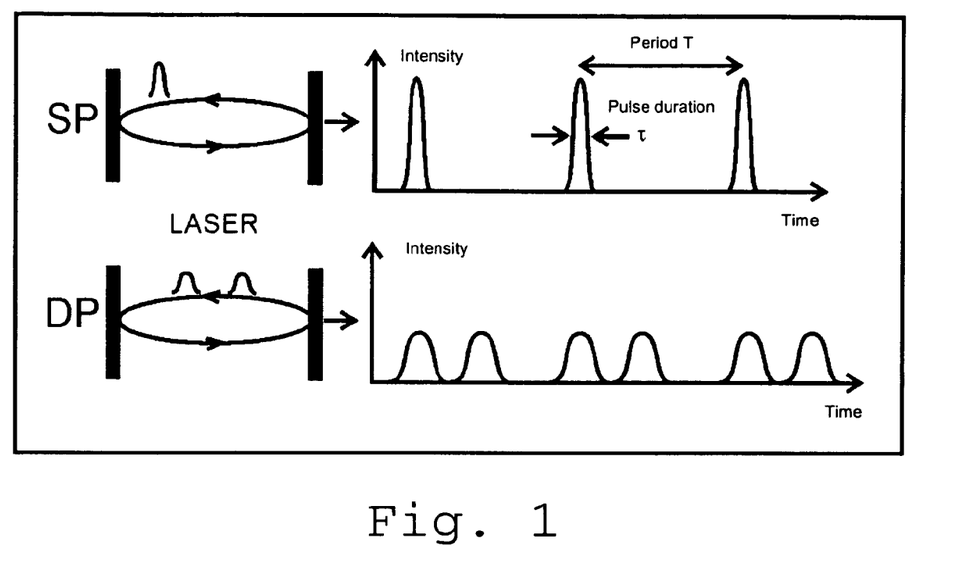
FIG. 1 shows the schematic diagram of the single- and double-pulse regime in a soliton laser.

FIG. 1 illustrates the single- and double-pulse regimes in a soliton laser in a schematic diagram. Ultra-short-pulse laser systems for generating femtosecond and picosecond pulses have an amplifying laser medium for producing a laser emission, a laser resonator having at least one resonator mirror and a pump source, such as, for example, a laser diode arrangement, for pumping the laser medium. The ultra-short-pulse laser system is operated in the soliton regime, it being possible to measure, for the laser emission, a first signal µ proportional to the pulse power P(t) averaged over the resonator cycle (average power, energy), e.g. by means of a photodiode operated in the one-photon absorption regime, for one or more pulses, as defined in equation 2.

$$\mu \cong \frac{1}{T_R} \cdot \int_{-T_R/2}^{T_R/2} P(t)dt \quad (2)$$

Here, $T_R$ designates the resonator cycle time and P(t) designates the instantaneous pulse power.

In the single-pulse state SP, a single pulse circulates within the resonator, the pulses having a time interval $T_R$. On occurrence of the double- or multiple-pulse state, the single pulse decomposes into two or more pulses separated with respect to time, these having on extraction a lower intensity and typically a somewhat higher total energy than the single pulse. This means that, in the case of the single pulses within the resonator cycle, the energy is approximately halved and the pulse width approximately doubled in the double-pulse case. This characteristic is utilised according to the invention for distinguishing between the two states by combining an intensity-sensitive detector with a detector sensitive to the total energy. On the basis of the detected signals for intensity and total energy or the ratio thereof, it is possible to distinguish the state.

Figure 2:
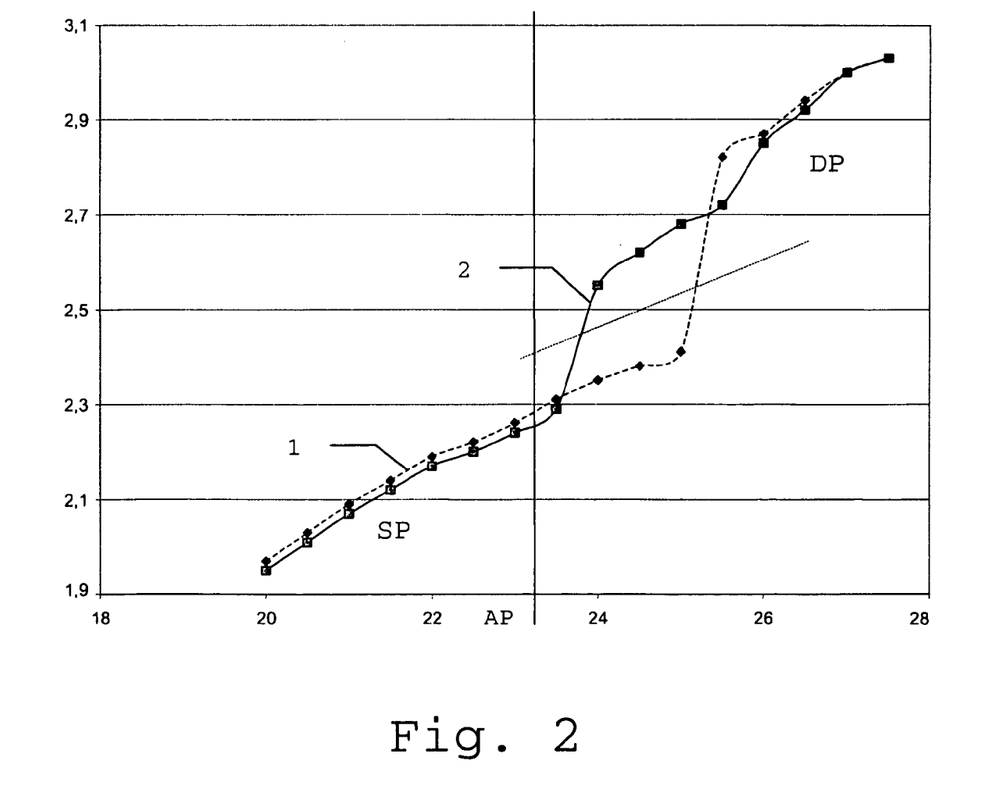
FIG. 2 shows the diagram of the hysteresis cycle on transition between the single- and double-pulse regime.

FIG. 2 shows the hysteresis cycle on transition between the single-pulse and double-pulse regime for a first signal µ.

Here, the horizontal axis designates the current of the pump source and hence indirectly the power coupled into the amplifying laser medium, whereas the vertical axis represents the outcoupled power. The hysteresis curve shown can be measured with a power meter or a photodiode, and the first signal $\mu$ in this example is therefore the result of a one-photon detection averaged over the resonator cycle times. The dashed curved shows the ascending behaviour 1 of the laser at the transition from the single-pulse state SP to the double-pulse state DP. The solid line corresponds to the descending behaviour 2 of the laser at the transition from the double-pulse state DP to the single-pulse state SP. The relationship expressed in equation (1) is true for both regimes, it being necessary to note that, at transitions, the gain saturation changes slightly owing to a shift of the dynamic losses in the resonator, which leads to the hysteresis shown. A possible operating point AP of the ultra-short-pulse laser can be chosen just below the hysteresis.

Figure 3:
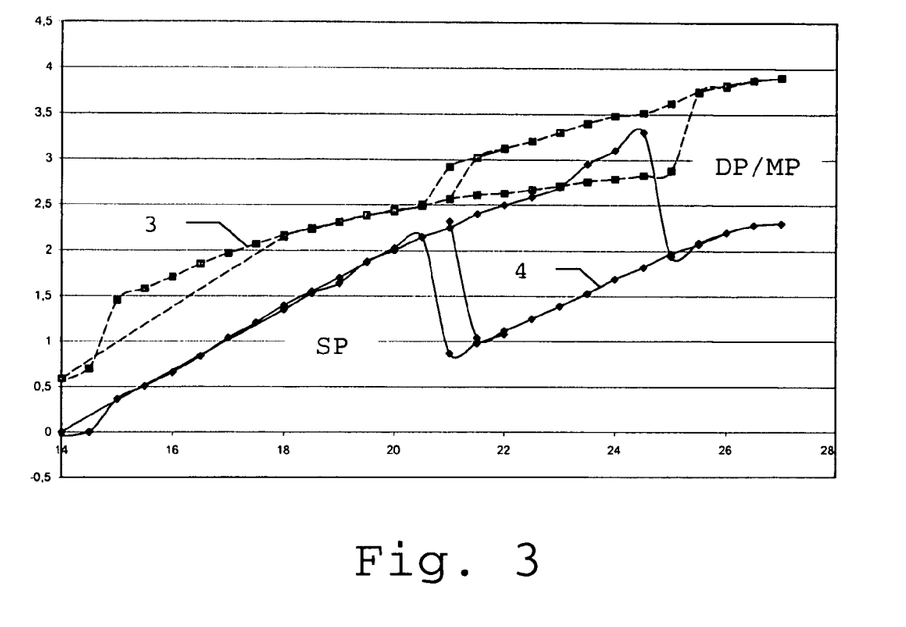
FIG. 3 shows the diagram of the single- and double-pulse state with hysteresis cycles for one- and two-photon detection.

FIG. 3 shows the diagram of single- and double-pulse state with hysteresis cycles for one- and two-photon detection. According to the invention, a second signal $\nu$ which is proportional to the square of the pulse power P(t), averaged over the resonator cycle, is recorded for detecting double pulses.

$$\nu \cong \frac{1}{T_R} \cdot \int_{-T_0/2}^{T_0/2} P^2(t) dt \qquad (3)$$

This can be realised, for example, with a second photodiode which exhibits two-photon absorption but no one-photon absorption. The two-photon signal 4 as second signal $\nu$ behaves at the transitions of state differently from the one-photon signal 3 as first signal $\mu$, since the peak power or peak intensity is a decisive criterion for the signal. Effectively, the peak power or peak intensity contributing to the two-photon signal 4 decreases at the transition from a single-pulse to the double-pulse state, whereas the one-photon energy or one-photon power, i.e. average power of the laser, increases. This difference, i.e. the evaluation of the two signals—one-photon and two-photon signal—makes it possible to detect the operating states of the laser unambiguously and instantaneously on the basis of a comparison of the measured signals $\mu$ and $\nu$.

A photodiode which can be used as a detector is operated as a rule in the one-photon regime; this means that a photon having an energy greater than that of the band edge in the PN transition is absorbed and an electron-hole pair is produced thereby. The applied bias voltage or the built-in potential of the PN transition results in a flow of current if the photodiode is terminated with a suitable resistance. This current is dependent in a linear manner on the incident power density. If the photon energy is lower than that of the band edge, there is no linear absorption and no photocurrent is produced. On the other hand, there is the possibility of producing an electron-hole pair by the cascading of two photons above a virtual level. Although this process is very improbable owing to the short-lived nature of the virtual level, it can be amplified by suitably high power densities. The so-called 2-photon absorption is proportional to the square of the power density, which is explained, for example, in R. L. Sutherland, "*Handbook of Nonlinear Optics*", Marcel Dekker, 1996, page 498.

As already explained, the laser emits a somewhat higher average power in the double- or multiple-pulse state DP/MP but, on the basis of equation (1), the total peak power contributing to the two-photon photocurrent is somewhat lower than in the single-pulse state SP. Since the two-photon detection depends on the square of the intensity, a lower signal is thus to be expected than in the single-pulse state SP. At a transition from the single-pulse state SP to the double- or multiple-pulse state DP/MP, a positive jump is to be expected in the one-photon signal and a negative jump in the two-photon signal, which can be illustrated as follows.

For the sake of simplicity, the power hysteresis will be neglected and it will be assumed that a laser emits a single pulse as a soliton, $\text{sech}^2(t)$ with pulse duration $\tau_{FWHM}=1.763 \cdot t_0$ and energy E. By a slight change of parameters, e.g. by changing the pumping current, etc., the laser now changes to the double-pulse state DP. On the basis of equations (1) and (3), the two-photon signal for both cases is consequently:

$$\nu_1 \propto \int \left(\frac{E}{2t_0} \cdot \text{sech}^2\left(\frac{t}{t_0}\right)\right)^2 dt \text{ and } \nu_2 \propto \int 2 \cdot \left(\frac{E}{8t_0} \cdot \text{sech}^2\left(\frac{t}{2t_0}\right)\right)^2 dt = \frac{\nu_1}{4} \qquad (4)$$

In general, the two-photon signal in the case of the multiple-pulse state is consequently:

$$\nu_n \propto \int n \cdot \left(\frac{E}{2n^2 t_0} \cdot \text{sech}^2\left(\frac{t}{nt_0}\right)\right)^2 dt = \frac{\nu_1}{n^2} \qquad (5)$$

In reality and taking into account the power increase at the transition, the expected difference in the case of the two-photon signals will be smaller than the factor $n^2$.

By way of example, the hysteresis cycle of a high-Q laser femtoTRAIN 2000 1040 nm 20 MHz was measured with one-photon and two-photon detection, which leads to the curve shown in FIG. 3. In order to produce a higher intensity, about 1% of the output power was focused onto the Hamamatsu G1116 GaAsP-photodiode. The latter has no linear absorption at the laser wavelength of 1040 nm, but there is in fact an adequate useful two-photon effective cross-section at this wavelength. The electronics consists of the simple amplifier shown in FIG. 4.

The hysteresis measurements are shown in FIG. 3, the dashed line representing the one-photon signal 3 and the solid line representing the two-photon signal 4. Here, the two-photon signal 4 was scaled so that, for the single-pulse state SP, it coincides as well as possible with the corresponding one-photon signal. The curves can be divided into various regions: the lower line of the one-photon signal 3 and the upper line of the two-photon signal 4 represent the single-pulse state SP. The upper line of the one-photon signal 3 and the lower line of the two-photon signal 4 correspond to the double-pulse state—DP. As a sufficiently simple and unambiguous criterion for distinguishing between the pulse states, it may be stated that a ratio of $|\mu-\nu|\leq 1$ indicates a single-pulse state, whereas a ratio of $|\mu-\nu|\geq 1.5$ is considered as an indicator of a double-pulse or multiple-pulse state DP/MP. An evaluation of the two signals by means of a simple software routine can then distinguish between the two states (SP or DP/MP).

In general, the transition of a laser from a pulse state having n pulses to the next highest pulse state having (n+1) pulses is visible with the aid of the power jump. Between multiple-pulse states having n pulses and (n+1) pulses, the average power increases and the pulse duration becomes longer. The differentiation between multiple-pulse states nMP and (n+1)MP can be performed by a similar criterion as described above for n=1. The limits of the difference $|\mu-\nu|$ for the two states are determined experimentally. For example, the triplepulse state is characterized by the ratio $|\mu-\nu| \geq 2.5$ whereas the double-pulse state is defined by the ratio $1.5 \leq |\mu-\nu|$. All possible pulse states can consequently be distinguished by means of a routine. It should once again be noted here that the pulse state detection can take place automatically and no assessment at all by an operator is necessary, as, for example, in the case of measurements using a fast photodiode and autocorrelator.

With regard to the detectors, it is possible to form the functionality of the first and second laser detector as different operating states of a photodiode so that measurement is effected in succession with one-photon and two-photon absorption using only one photodiode, i.e. the first signal $\mu$ is measured in a known manner and the second signal $\nu$ is measured by means of two-photon or multiphoton absorption.

Further possibilities of two-photon or multiphoton detection consists, for example, in the use of LEDs or photoresistors with a multiphoton effect or Si avalanche photodiodes (APD). The fundamental approaches are described, for example, in the following documents: Reid D. T. et al., "Light-emitting diodes as measurement devices for femtosecond laser pulses", Optics Letters, Vol. 22, No. 4, 15 Feb. 1997, pages 233 to 235, and Kikuchi K., "Highly sensitive interferometric autocorrelator using Si avalanche photodiode as two-photon absorber", Electronics Letters, Vol. 34, No. 1, 8 Jan. 1998, pages 123 to 125.

The response of these components to the incoming signal depends on the peak intensity: the higher the intensity, the greater is the signal. A measurement of this signal in comparison with the laser power also permits a determination of the operating state.

The measurement of the two-photon or multiphoton absorption can likewise be effected in transmission, for example using InP as the two-photon absorber. Since the absorption is dependent on the peak power of the pulse, it is sufficient to measure the transmitted, i.e. switched-through, power. If the power is high, the laser is in the double-pulse or multiple-pulse state DP/MP.

An alternative for recording a second signal $\nu$ consists in the use of a frequency multiplication, in particular frequency doubling or frequency tripling. Such multiplication methods use crystals, such as, for example, BBO (barium borate), LBO (lithium triborate), PPLN (periodically poled lithium niobate) or KTP (potassium titanyl phosphate). The signal ratios in the case of SP, DP/MP transitions correspond to those of the two-photon absorption. Since the peak intensity is lower in the case of the double- or multiple-pulse state DP/MP, the multiplied signal is lower than in the single-pulse state, it being possible for the detection to be carried out, for example, by means of a power meter. The ratio between single-pulse state SP and double- or multiple-pulse state DP/MP is 1/4 or $1/n^2$.

The detection of the operating state permits provision of methods for avoiding multiple-pulse states and for adjusting or optimising the laser operating point.

A possible calibration routine is as follows:
The laser is thermostatted and optimally adjusted.
For determining the transition from single-pulse state SP to double- or multiple-pulse state DP/MP, the laser is changed in a targeted manner to the double- or multiple-pulse state. For this purpose, the pumping power is increased to the permitted maximum.
Beginning with the double- or multiple-pulse state DP/MP, a section of the power-operating current curve is now measured by reducing the operating current for the pump source stepwise, for example in 0.5 A steps.

The MP-DP-SP transitions are observed on the basis of the measured signals $|\mu-\nu|$. After the DP-SP transition has been established, the operating current found for this transition can be defined as the current for the operating point. This operating current value or the measured power is the operating point AP determined first.

The stability of the AP found can be verified by switching on and off several times. No double- or multiple-pulse state DP/MP is permitted to occur during a plurality of switch-on/switch-off processes (for example, 5-10 cycles, in each case about 10 seconds).

In the case of some soliton lasers, the operating parameters at which the laser falls into mode-locked operation on switching on may for various reasons be relatively close to or within the SP-DP/MP hysteresis. In this case, for example, a current ramp can be chosen as a method for switching on the laser.

The laser is switched on with an increased current. In addition, the mode-locked operation may be excited by a further parameter change (dispersion, acoustic disturbance, etc. . . ). This places it in the mode-locked double-pulse or multiple-pulse state DP/MP. The increased operating current is maintained for a few seconds.

The operating current is then slowly reduced to a value which is below the DP-SP transition, which places the laser in the mode-locked single-pulse state SP. The reduced operating current is maintained for a few seconds.

The operating current is then slowly brought again to the nominal value, which may in certain circumstances be within the SP-DP/MP hysteresis.

Figure 4:
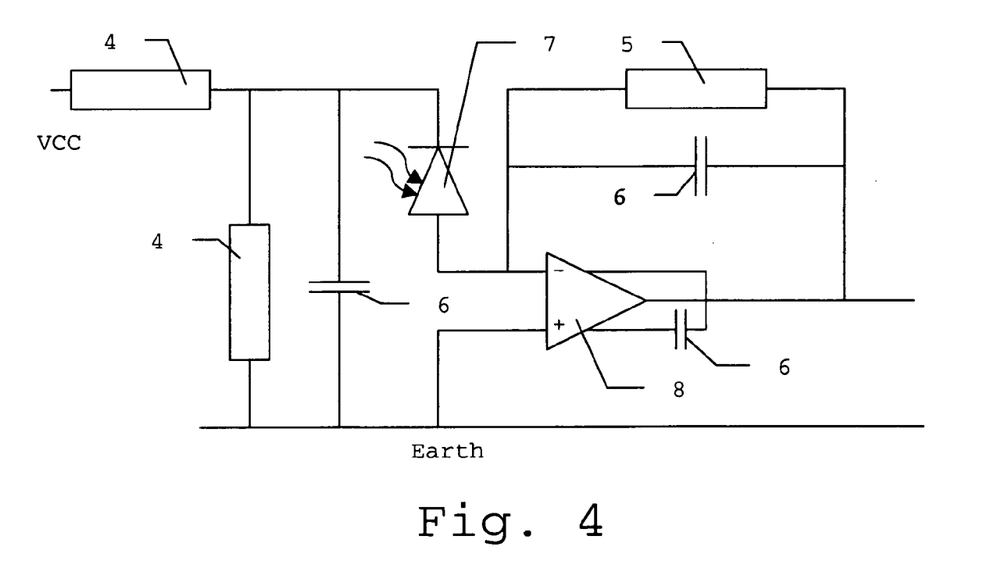
FIG. 4 shows the schematic diagram of an amplifier circuit for two-photon detection.

FIG. 4 shows the schematic diagram of a simple amplifier circuit for two-photon detection comprising two 100 kΩ resistors 4, a 1 MΩ resistor 5, three 470 pF capacitors 6, a Hamamatsu G1116 GaAsP photodiode 7 and an operation amplifier 8, VCC designating the supply voltage.

Figure 5:
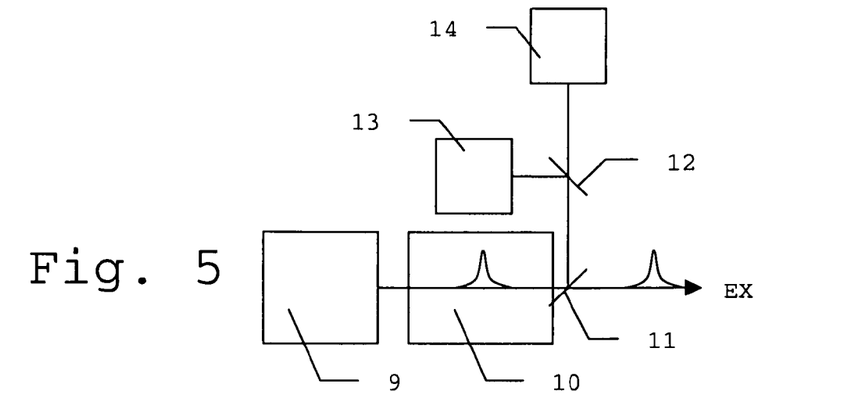
FIG. 5 shows a first embodiment of an arrangement according to the invention comprising two laser detectors.

FIG. 5 explains in more detail a first embodiment of an arrangement according to the invention, comprising two laser detectors as can be used, for example, with or in an ultra-short-pulse laser system which can be operated in the soliton regime and is intended for generating femtosecond or picosecond pulses. Such laser systems have an oscillator 10 as a laser resonator with at least one resonator mirror, an amplifying laser medium for producing laser emission and a coordinated pump source 9, in particular a laser diode source, for pumping the laser medium. Laser light is coupled out via a deflecting mirror 11, which may be arranged inside or outside the oscillator 10 or the cavity, and fed to a splitter mirror 12. Here, EX designates the exit of the laser system. A first laser detector 13 and a second laser detector 14 are arranged after the splitter mirror, the first laser detector 13 being designed for measuring average pulse power or pulse energy for one or more pulses. The first laser detector 13 may be a photodiode operated in the one-photon absorption regime.

The second laser detector 14 is formed for measuring peak pulse power or peak pulse intensity for one or more pulses, an evaluation component for detecting the occurrence of a double- or multiple-pulse state (DP/MP) on the basis of a comparison of the measured signals of first and second laser detector not being shown here for reasons of clarity. The second laser detector 14 can be realised as a photodiode operated in the two-photon or multiphoton absorption regime.

A use of one-photon or multiphoton absorption regimes also permits the realisation of the functionality of two separate laser detectors by different modes, i.e. the first and second laser detector 13, 14 are realised by or as different operating states of a photodiode.

The second laser detector 14 can, however, also be an LED or a photoresistor with a two-photon or multiphoton effect or can be provided with InP for two-photon absorption in transmission.

Figure 6:
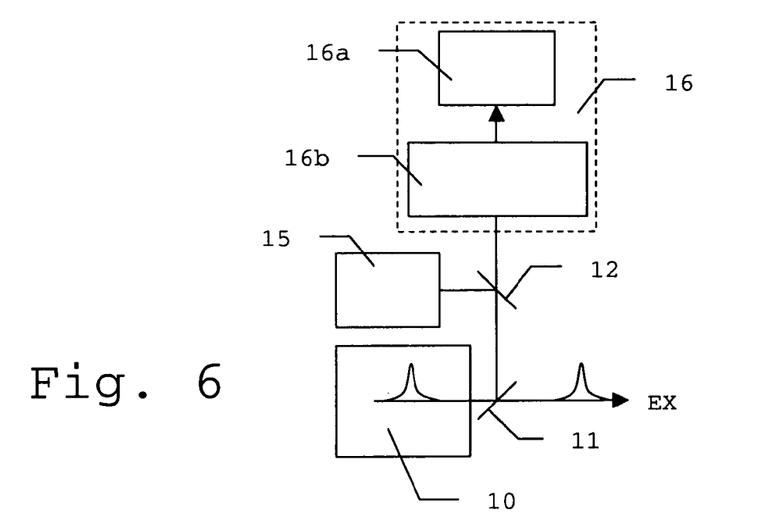
FIG. 6 shows a second embodiment of an arrangement according to the invention comprising two laser detectors.

A second embodiment of an arrangement according to the invention comprising two laser detectors is shown in FIG. 6. After coupling out from the oscillator 10 via a deflecting mirror 11, the laser light is fed by a splitter mirror 12 onto a power meter 15 as a first detector and a power meter 16a having a component 16b for frequency doubling or frequency multiplication, which in this combination thus form the second detector. For realising the specific functionality of the second laser detector 16, an additional functional component 16b, e.g. at least one BBO, LBO, PPLN or KTP crystal, is thus connected before a power meter 16a which in principle can be designed to be identical to or of the same type as the power meter 15 as first detector.

Further detector concepts for detecting double- or multiple-pulse states can be combined with the approach according to the invention comprising two detectors or can supplement them or in certain circumstances replace them.

These are explained in FIG. 7 to 9a-b. However, they are in principle independent of the two-detector approach according to the invention.

Figure 7:
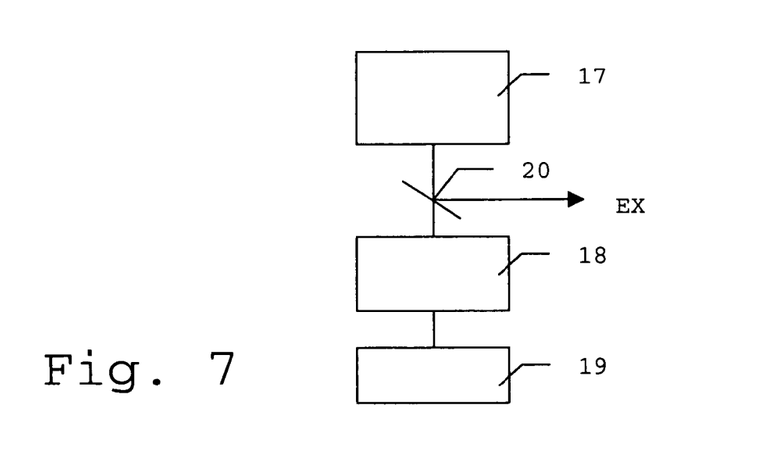
FIG. 7 shows a first alternative or supplementary embodiment for the arrangement according to the invention comprising a saturable absorber.

FIG. 7 shows a first alternative or supplementary embodiment to the arrangement according to the invention, comprising a saturable absorber 18. Laser light is fed from the laser system 17 via a deflecting mirror 20 to the exit EX. The deflecting mirror which is designed for beam-splitting permits a part of the light to be incident via a saturable absorber 18 on a laser detector 19. This measures the transmission through the fast saturable absorber 18, it being possible for this to be or have, for example, a quantum wave absorber, such as, for example, InGaAs between GaAs or other materials having suitable energy gaps. This shows intensity-dependent saturation behaviour, so that a differentiation of the different pulse states can likewise be realised. The saturable material absorbs the incoming energy and, on saturation, allows the pulses to pass through. The saturation depends on the pulse duration and the pulse intensity. The suitable choice of the saturable absorber makes it possible to allow through the pulses in the single-pulse state SP to a greater extent and tends to block the pulses in the double- or multiple-pulse state DP/MP, so that the operating state of the laser can be determined on the basis of the power allowed to pass through. As shown by the following calculation, the signal contrast between the two states in non-saturated operation of the saturable material is greater than in saturated operation.

Figure 8:
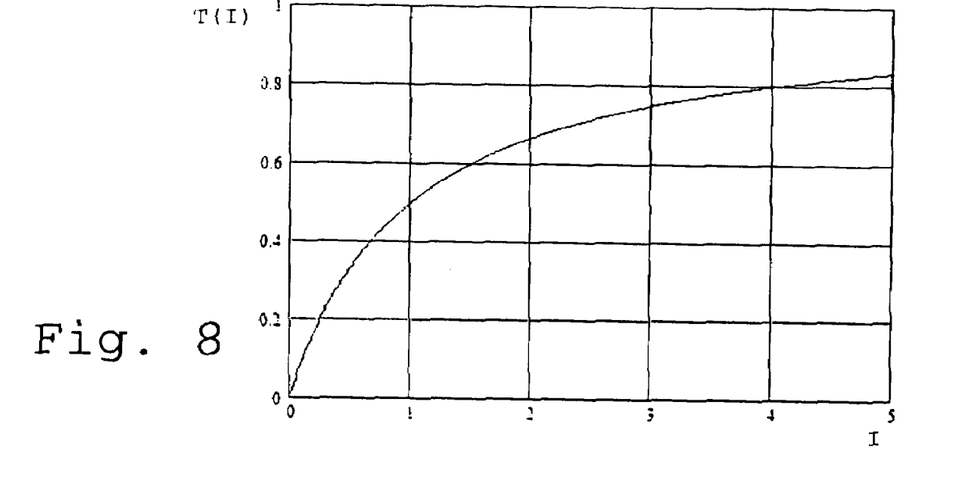
FIG. 8 shows a schematic diagram of the transmission by a fast saturable absorber and FIG. 9a-b show a second alternative or supplementary embodiment for the arrangement according to the invention with spectral pulse analysis.

The intensity-dependent transmittance can be written as follows $$T(I) = 1 - \frac{A_0}{1 + \frac{I}{I_{Sat}}} \qquad (6)$$

where $I_{Sat}$ designates the saturation intensity and $A_0$ designates the absorption power. For the saturated state with $I=I_{Sat}$ and $A_0=1$ it follows that $T(I_{SP})=0.5$ $T(I_{DP})=2 \cdot T(I_{SP}/4)=0.4$ $T(I_{SP})/T(I_{DP})=1.25$ Whereas, for an unsaturated state with $I=0,1 \ I_{Sat}$ and $A_0=1$, a comparatively higher signal contrast $T(I_{SP})/T(I_{DP})$ follows $T(I_{SP})=0.091$ $T(I_{DP})=2 \cdot T(I_{SP}/4)=0.049$ $T(I_{SP})/T(I_{DP})=1.86$ FIG. 8 shows, by way of example, the curve of the transmittance T(I) through a fast saturable absorber as a function of the normalised intensity $I/I_{sat}$ before the absorber.

Figure 9A:
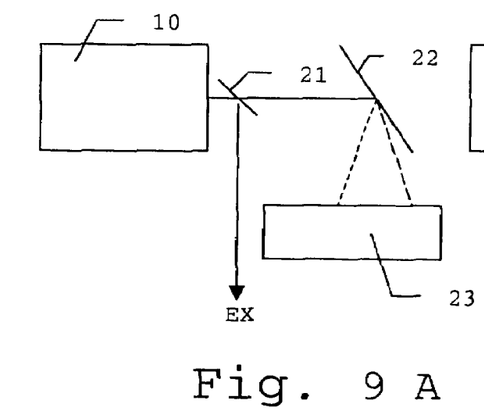
Figure 9B:
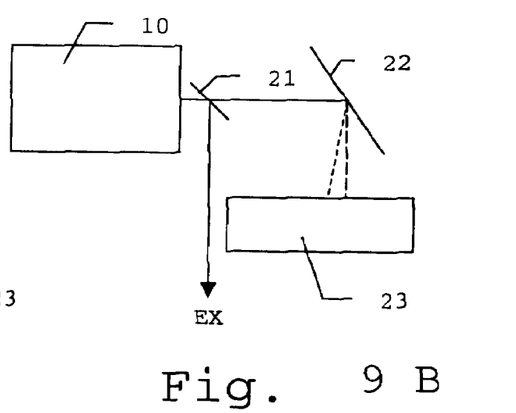

A second alternative or supplementary embodiment to the arrangement according to the invention comprising spectral pulse analysis is explained in more detail schematically in FIG. 9a-b. This further alternative for the detection of the pulse state consists in the use of the spectral resolution of the pulses. In the double or multiple state DP/MP, the pulse is of longer duration but on the other hand its spectral bandwidth is smaller than in the single-pulse state SP. The comparison of the spectral bandwidths using, for example, a spectrometer makes it possible to determine the laser state. In order to avoid ambiguities, it is possible also to measure the laser power and to evaluate both measurements. For example, the pulse originating from the oscillator 10 via an outcoupling mirror 21 can be fed to a subsequent grating 22 and the pulse can be spatially decomposed. Thereafter, for example, a CMOS or CCD camera 23 or another optical detector permits the recording of the resulting flecks. On the basis of the fleck size or by means of an aperture and a power meter, it is then possible to distinguish between the SP and DP states. The case of the single-pulse state SP with broader spectrum or fleck is shown in FIG. 9a and the case of the double or multiple state DP/MP with comparatively narrower spectrum or fleck is shown in FIG. 9b.

Of course, the arrangements shown represent purely exemplary embodiments, and components can also be arranged at other points or, depending on the specific design, may also be omitted, such as, for example, splitter mirror or outcoupling mirror. Furthermore, the embodiments shown in FIG. 7 to 9a-b may also be combined as a second detector with a first detector of the approach according to the invention.

The invention claimed is:

1. Detection method for undesired double- or multiple-pulse states (DP/MP) in an ultra-short-pulse laser system for generating femtosecond or picosecond pulses, comprising at least
    an amplifying laser medium for producing a laser emission,
    a laser resonator having at least one resonator mirror and
    a pump source, in particular a laser diode source, for pumping the laser medium,
    the ultra-short-pulse laser system being operated in the soliton regime and a first signal μ proportional to the pulse power P(t) or pulse energy averaged over the resonator cycle being measured for the laser emission,
    wherein
    a second signal ν proportional to the square of the pulse power P(t), averaged over the resonator cycle, is measured for the laser emission and the occurrence of an undesired double- or multiple-pulse state (DP/MP) is detected on the basis of a comparison of the measured signals μ and ν which are independent in the range of resonator cycle times.

2. Detection method according to claim 1, wherein the first signal μ is measured by means of one-photon absorption.

3. Detection method according to claim 1, wherein the second signal ν is measured by means of two-photon or multiphoton absorption.

4. Detection method according to claim 1, wherein the second signal ν is measured using frequency multiplication, in particular frequency doubling or tripling.

5. Detection method according to claim 1, wherein a ratio of $|\mu-\nu| \leq 1$ indicates a single-pulse state (SP), the two signals μ and ν in a state with defined single-pulse characteristic being calibrated so that they substantially correspond.

6. Detection method according to claim 1, wherein a ratio of von $|\mu-\nu| \geq 1.5$ indicates a double- or multiple-pulse state (DP/MP), the two signals μ and ν in a state with defined single-pulse characteristic being calibrated so that they substantially correspond.

7. Method for avoiding double- or multiple-pulse states (DP/MP) and optimising the laser operating point (AP) by a detection method according to claim 1,
- placing of the ultra-short-pulse laser system in the double- or multiple-pulse state (DP/MP),
- reduction of the operating current for the pump source for deriving the dependency of the signals μ and ν on the operating current,
- determination of the operating current value for the transition from the double- or multiple-pulse state (DP/MP) to the single-pulse state (SP).

8. Method according to claim 7, wherein an increase to an operating current end value is effected after the reduction of the operating current.

9. Measuring apparatus for detecting double- or multiple-pulse states (DP/MP) in an ultra-short-pulse laser system which can be operated in the soliton regime and is intended for generating femtosecond or picosecond pulses; comprising at least one laser detector, this first laser detector being formed and arranged so that a signal proportional to the pulse power P(t) or pulse energy averaged over the resonator cycle can be measured for one or more pulses,
- a second laser detector, this second laser detector being formed and arranged so that a signal proportional to the square of the pulse power P(t), averaged over the resonator cycle, can be measured for one or more pulses, and
- an evaluation component for detecting the occurrence of a double- or multiple-pulse state (DP/MP) on the basis of a comparison of the measured signals of first and second laser detector.

10. Measuring apparatus according to claim 9, wherein the first laser detector is a photodiode operated in the one-photon absorption regime.

11. Measuring apparatus according to claim 9, wherein the second laser detector is a photodiode operated in the two-photon or multiphoton absorption regime.

12. Measuring apparatus according to claim 10, wherein the first and second laser detectors are in the form of different operating states of a photodiode.

13. Measuring apparatus according to claim 9, wherein the second laser detector is an LED or a photoresistor with two-photon or multiphoton effect or has InP for 2-photon absorption in transmission.

14. Measuring apparatus according to claim 9, wherein the second laser detector has at least one BBO, LBO, PPLN or KTP crystal for frequency multiplication.

15. Ultra-short-pulse laser system for generating femtosecond or picosecond pulses, comprising at least
- an amplifying laser medium for producing a laser emission,
- a laser resonator having at least one resonator mirror,
- a pump source, in particular a laser diode source, for pumping the laser medium and
- a measuring apparatus according to claim 10.

* * * * *